(12) United States Patent
Fukano et al.

(10) Patent No.: US 9,062,778 B2
(45) Date of Patent: Jun. 23, 2015

(54) VALVE HAVING A DIAPHRAGM CAPABLE OF DISPLACEMENT WITHIN A RETAINING MEMBER

(71) Applicant: SMC Kabushiki Kaisha, Chiyoda-ku (JP)

(72) Inventors: Yoshihiro Fukano, Moriya (JP); Yasunori Shiraga, Kitakatsushika-gun (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 14/050,653

(22) Filed: Oct. 10, 2013

(65) Prior Publication Data
US 2014/0131597 A1    May 15, 2014

(30) Foreign Application Priority Data

Nov. 12, 2012    (JP) .................................. 2012-248117

(51) Int. Cl.
*F16K 5/08* (2006.01)
*F16K 7/12* (2006.01)
*F16K 41/12* (2006.01)

(52) U.S. Cl.
CPC . *F16K 5/08* (2013.01); *F16K 7/126* (2013.01); *F16K 41/12* (2013.01)

(58) Field of Classification Search
CPC ............... F16K 5/08; F16K 7/00; F16K 7/12; F16K 7/126; F16K 31/0655; F16K 31/122; F16K 41/12; F16J 15/20
USPC .............. 251/62–63, 63.5–63.6, 129.17, 331, 251/335.2; 277/529–530
See application file for complete search history.

(56) References Cited

U.S. PATENT DOCUMENTS 2,665,105 A * 1/1954 Svabek, Jr. .................. 251/335.2
2,699,801 A * 1/1955 Schleyer ..................... 251/335.2
(Continued)

FOREIGN PATENT DOCUMENTS

JP    62-040256 U    3/1987
JP    63-118456 U    7/1988
(Continued)

OTHER PUBLICATIONS

Office Action issued Aug. 29, 2014 in Korean Patent Application No. 10-2013-0135706 (with English translation of pertinent portion).
(Continued)

*Primary Examiner* — John Bastianelli
(74) *Attorney, Agent, or Firm* — Oblon, McClelland, Maier & Neustadt, L.L.P.

(57) ABSTRACT

A valve mechanism, which constitutes a solenoid valve as one example of a valve, includes a valve plug that is displaced in an axial direction under an excitation action of a solenoid unit, and is equipped with a flexible diaphragm disposed between a valve body and an annular groove formed on an outer circumferential surface of the valve plug. The diaphragm is flexible accompanying displacement of the valve plug and includes first through third projections on an inner edge portion thereof. In addition, the first through third projections are capable of coming into abutment, respectively, against an inner circumferential surface, a first wall surface, and a second wall surface of the annular groove. Further, the inner edge portion is inserted in the interior of the annular groove while being movable slightly in the direction of displacement of the valve plug.

6 Claims, 7 Drawing Sheets

(56) References Cited

U.S. PATENT DOCUMENTS

| | | | | |
|---|---|---|---|---|
| 2,702,686 | A | * | 2/1955 | Fortune ................... 251/335.2 |
| 2,784,934 | A | * | 3/1957 | Paulius, Jr. et al. ........ 251/335.1 |
| 3,698,688 | A | * | 10/1972 | Kutz ........................ 251/335.2 |
| 4,312,380 | A | * | 1/1982 | Leiber et al. ............. 251/129.17 |
| 5,779,224 | A | * | 7/1998 | Fukano et al. ................ 251/331 |
| 6,216,731 | B1 | * | 4/2001 | Frenkel ..................... 251/335.2 |
| 6,719,268 | B2 | * | 4/2004 | Fukano et al. ........... 251/129.17 |
| 7,048,252 | B2 | * | 5/2006 | Shibata .................... 251/129.15 |
| 7,080,817 | B2 | * | 7/2006 | Stern ....................... 251/129.17 |
| 7,441,560 | B2 | * | 10/2008 | Sonoda et al. ........... 251/129.17 |
| 2004/0031941 | A1 | | 2/2004 | Hirata et al. |

FOREIGN PATENT DOCUMENTS

| | | |
|---|---|---|
| JP | 4-66471 U | 6/1992 |
| JP | 2006-83879 | 3/2006 |
| JP | 2008-116024 | 5/2008 |
| WO | WO 02/35126 | 5/2002 |

OTHER PUBLICATIONS

Notice of Allowance issued on Dec. 17, 2014 in Korean Patent Application No. 10-2013-0135706 with English translation of pertinent portion.

* cited by examiner

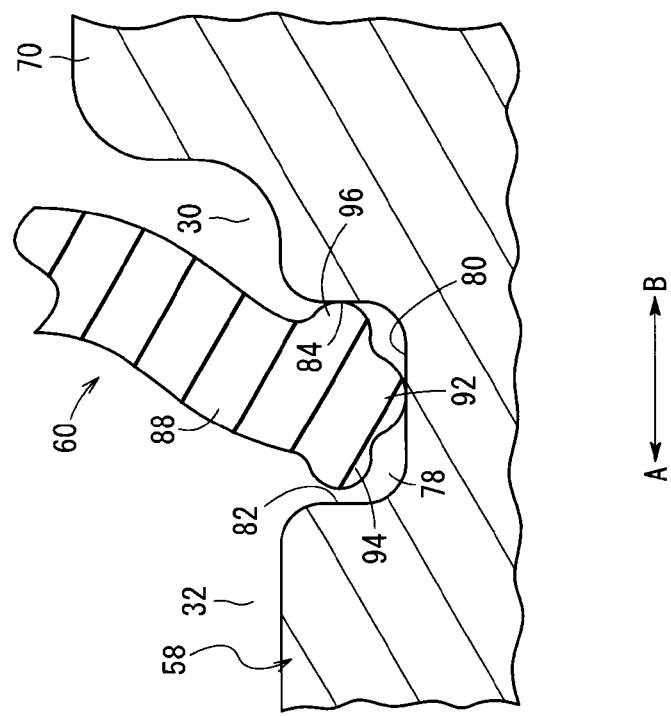
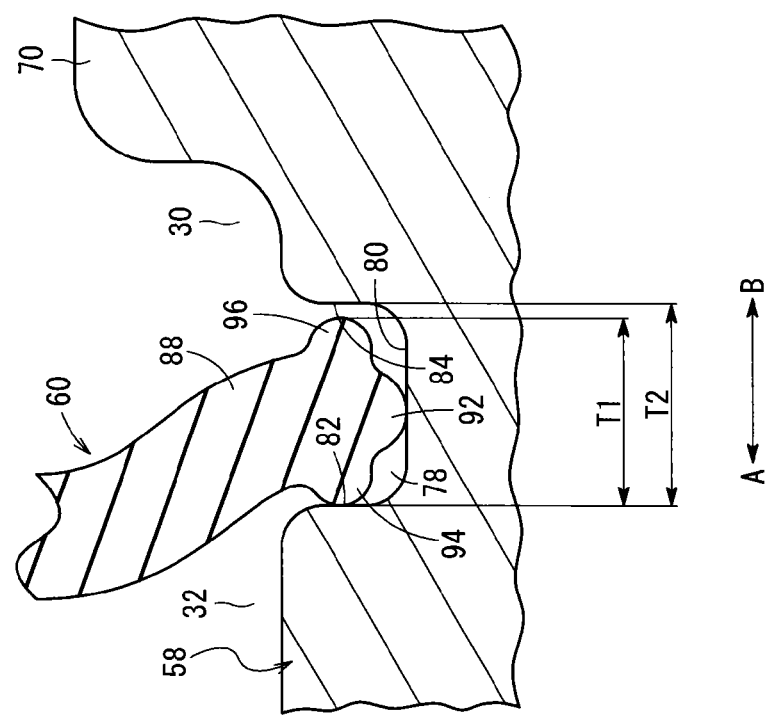

VALVE HAVING A DIAPHRAGM CAPABLE OF DISPLACEMENT WITHIN A RETAINING MEMBER

CROSS-REFERENCE TO RELATED APPLICATION

This application is based upon and claims the benefit of priority from Japanese Patent Application No. 2012-248117 filed on Nov. 12, 2012, the contents of which are incorporated herein by reference.

BACKGROUND OF THE INVENTION

1. Field of the Invention

The present invention relates to a valve including a valve plug, which is displaced under the supply of a pressure fluid or an electric current, for switching a communication state of a fluid passage by opening and closing operations of the valve plug.

2. Description of the Related Art

Heretofore, a valve has been used for controlling a flow through state of a pressure fluid by supplying a pressure fluid to an actuator, or alternatively, by discharging compressed air to the atmosphere.

Such a valve, for example, as disclosed in Japanese Laid-Open Patent Publication No. 2006-083879, is equipped with a body having a fluid passage therein through which a fluid flows, a valve plug, which is disposed for displacement in the interior of the body, and a solenoid unit connected to the body and having a coil that is excited upon supply of an electric current thereto. A magnetic force is generated by energizing the solenoid unit, whereby the valve plug is opened by displacement of a movable iron core. Additionally, a diaphragm is disposed between the solenoid unit and the body. An inner circumferential side of the diaphragm is inserted into an annular groove of a shaft connected to the valve plug, whereas the outer circumferential side of the diaphragm is sandwiched between the body and the solenoid unit, so that leakage of pressure fluid between the solenoid unit and the interior of the body through which the fluid flows is prevented.

SUMMARY OF THE INVENTION

In general, a diaphragm that is used with the aforementioned type of valve is formed from an elastic material such as rubber or the like, which is capable of being flexed following displacement of the valve plug. However, accompanying displacement thereof, loads are generated on the inner circumferential side of the diaphragm as a result of the inner circumferential side being displaced integrally together with the valve plug, and by repeated generation of such loads, cracking starts to occur at the working portion of the diaphragm, which leads to a decline in the durability of the diaphragm. Further, upon displacement of the valve plug, since the diaphragm is displaced while undergoing a certain amount of deformation, it becomes difficult for the valve plug to be operated at high speeds to carry out opening and closing operations of the valve plug. Additionally, compared to a situation in which the valve plug is displaced independently, a greater driving force is required, which leads to an increase in power consumption in the solenoid unit.

A general object of the present invention is to provide a valve in which the durability of a diaphragm can be improved, together with enabling opening and closing operations of a valve plug to be carried out at high speeds, while reducing power consumption or the pressure of a working fluid used for operating the valve.

The present invention is characterized by a valve comprising:

a valve body having ports to which a pressure fluid is supplied and from which the pressure fluid is discharged;

a valve plug disposed displaceably in an interior of the valve body for switching a state of communication of the ports;

a drive unit connected to the valve body and which displaces the valve plug in an axial direction upon supply of a current or a working fluid to the drive unit;

a flexible diaphragm in form of a sheet, which is disposed between the valve plug and the valve body; and a retaining member for retaining the diaphragm so as to be capable of displacement with respect to the valve plug.

According to the present invention, in a valve having a drive unit that causes displacement of a valve plug by an electric current or by supply of a working fluid, a flexible diaphragm in the form of a sheet is provided, which is disposed between the valve plug and the valve body, whereby the diaphragm is retained by the retaining member while permitting displacement of the diaphragm with respect to the valve plug.

Accordingly, when the valve plug is opened and closed under a driving action of the drive unit, the diaphragm is capable of being displaced with respect to the valve plug by operation of the retaining member. Thus, compared to a case in which the diaphragm is fixed entirely with respect to the valve plug, stresses generated in the vicinity of the valve plug by displacement of the valve plug can be reduced. As a result, loads imposed on the diaphragm can be alleviated, and durability of the diaphragm can be improved. Further, since running resistance (i.e., resistance to movement) of the diaphragm is reduced as a result of the retaining member enabling displacement of the diaphragm when the valve plug is operated, the driving load of the valve plug upon displacement thereof together with the diaphragm can be reduced and durability can be improved, the valve plug can be opened and closed at high speeds, and power consumption when the drive unit is driven by an electric current, or a working pressure if the drive unit is driven by a working fluid, can be suppressed.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5A is an enlarged cross sectional view showing the vicinity of an inner edge portion of the diaphragm in the condition of FIG. 3;

FIG. 5B is an enlarged cross sectional view showing the vicinity of an inner edge portion of the diaphragm in the condition of FIG. 4;

DESCRIPTION OF THE PREFERRED EMBODIMENTS

Figure 1:
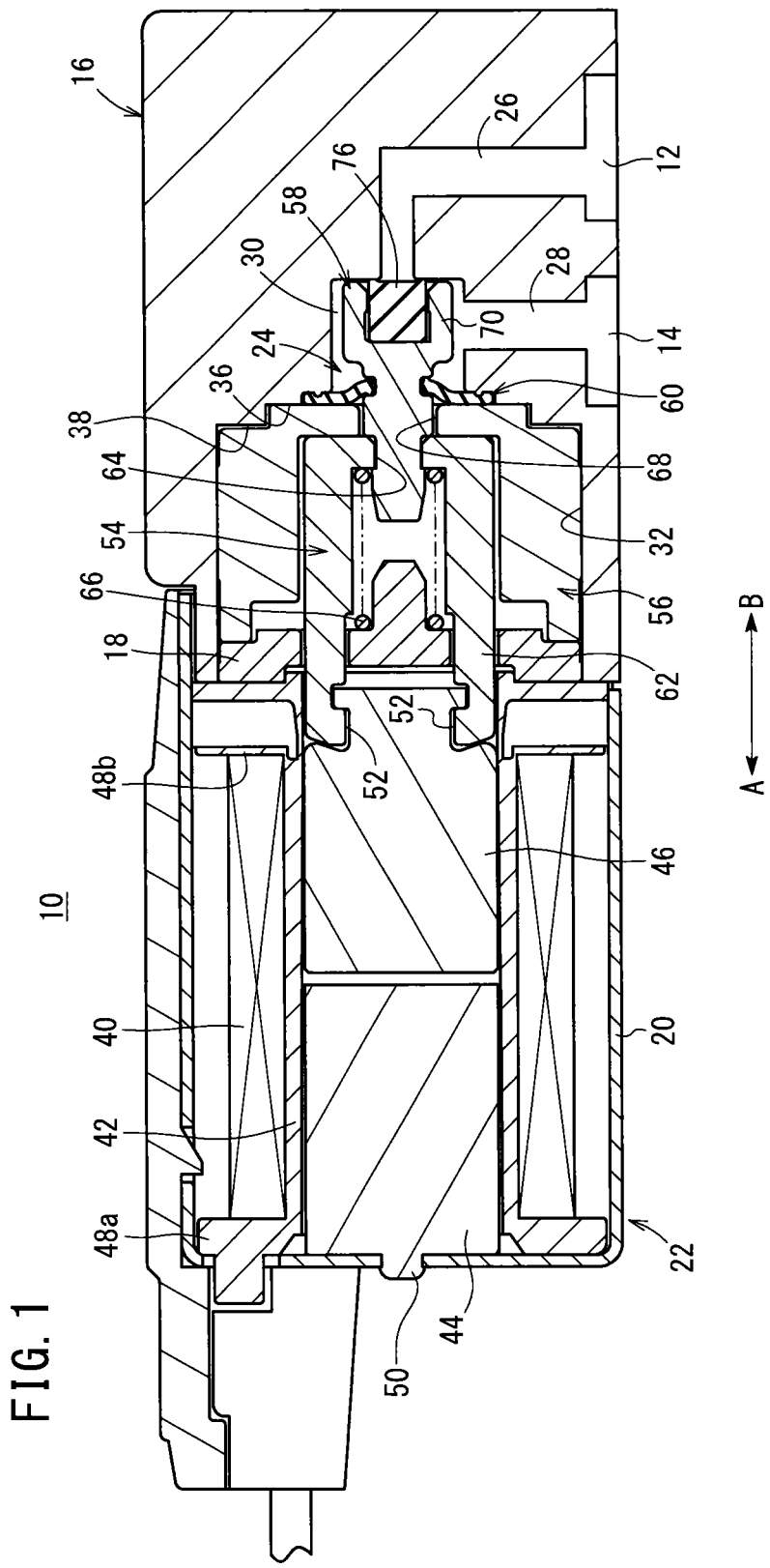
FIG. 1 is an overall vertical cross sectional view of a solenoid valve, as one example of a valve according to a first embodiment of the present invention.
Figure 2:
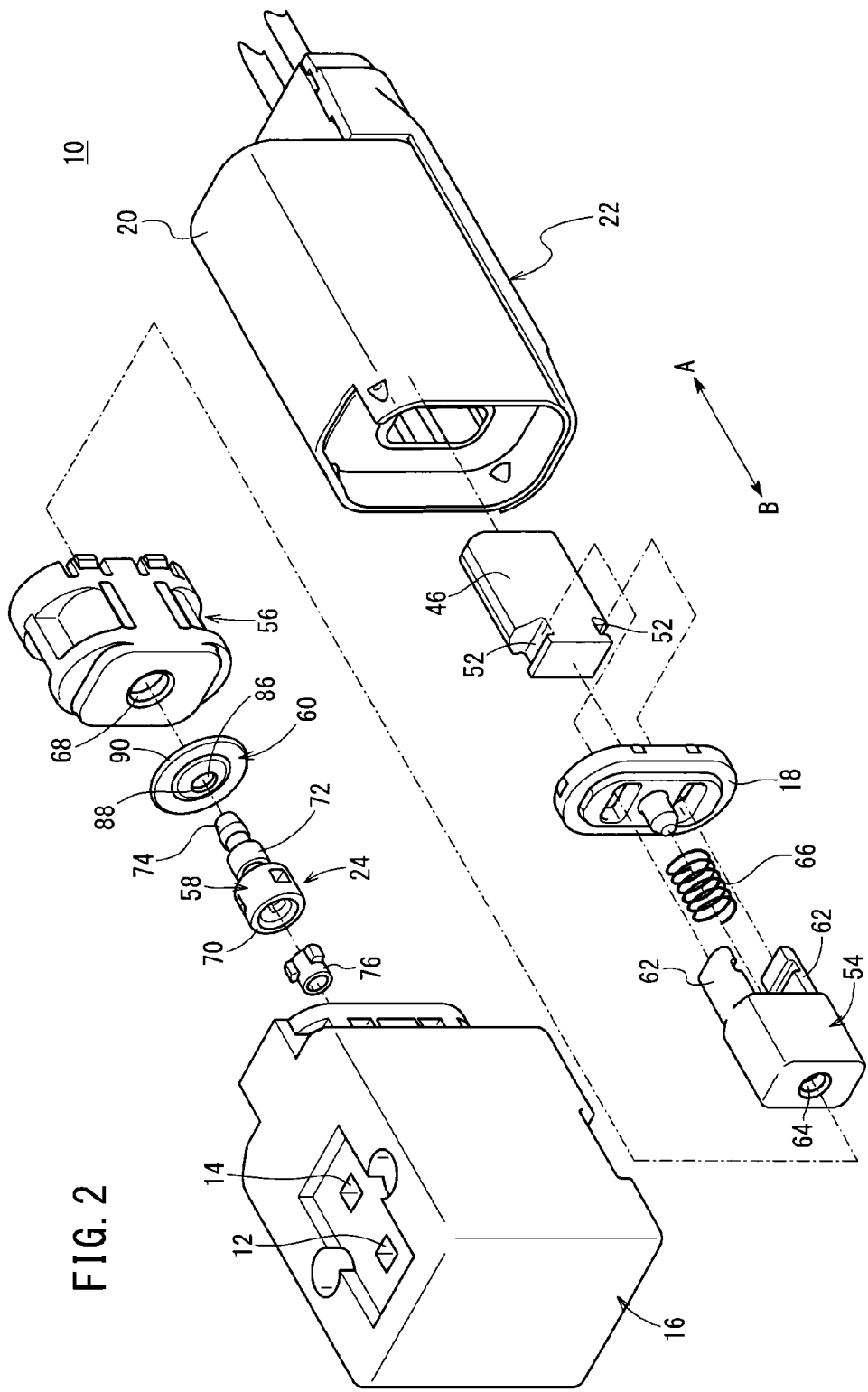
FIG. 2 is an exploded perspective view of the solenoid valve of FIG. 1.
Figure 3:
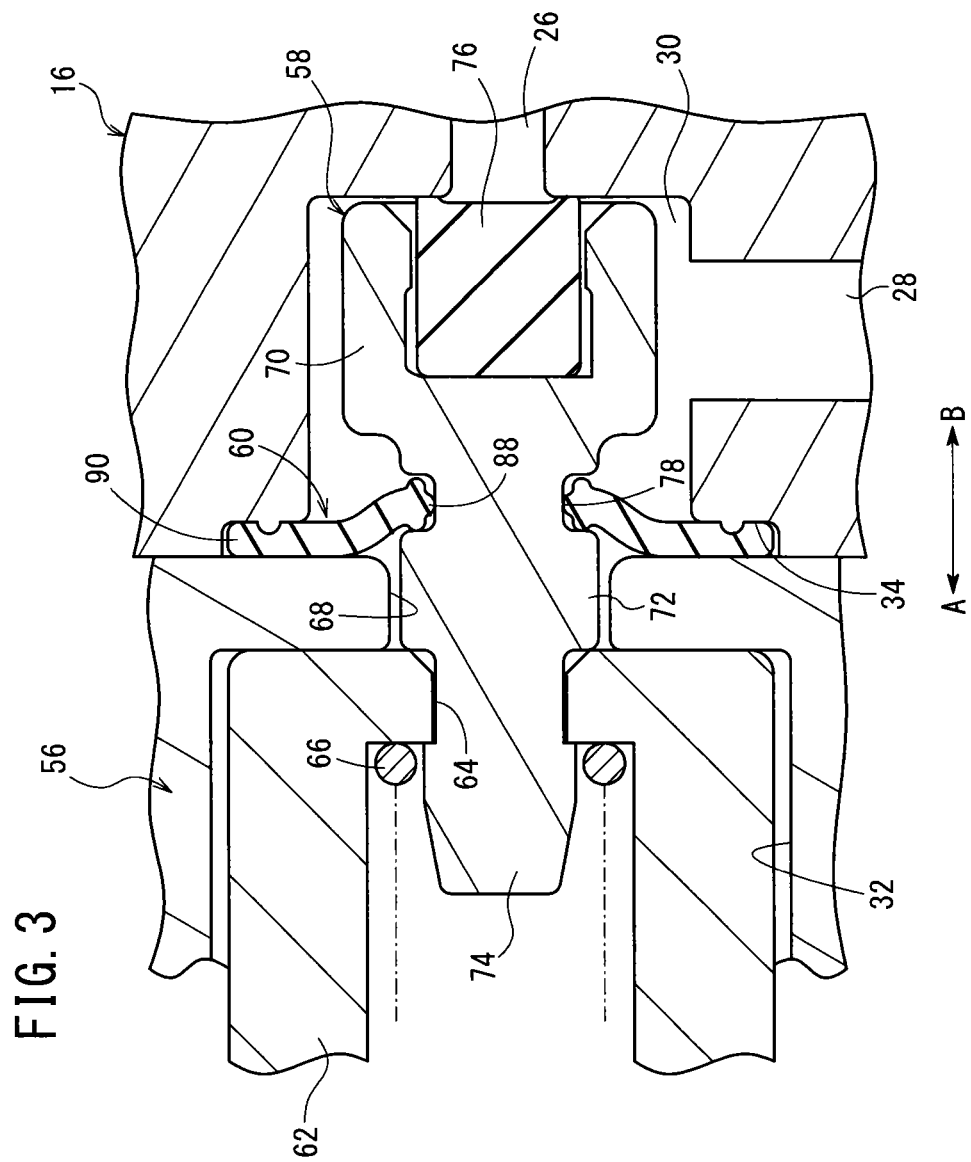
FIG. 3 is an enlarged cross sectional view showing the vicinity of a valve plug in the solenoid valve of FIG. 1.
Figure 4:
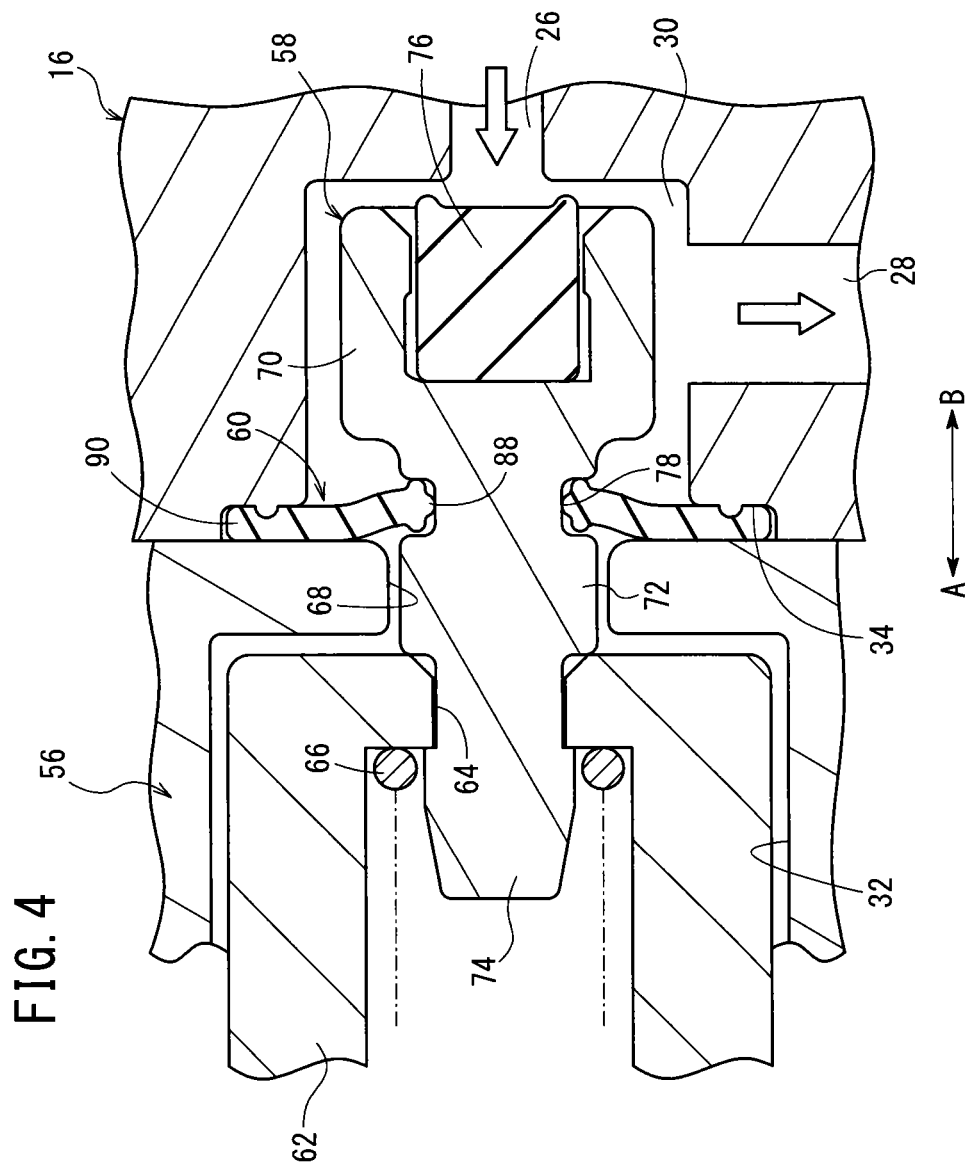
FIG. 4 is an enlarged cross sectional view showing a valve-open state of the solenoid valve of FIG. 3.

A solenoid valve 10, as shown in FIGS. 1 and 2, includes a valve body 16 having first and second ports 12, 14 to which a pressure fluid is supplied and from which the pressure fluid is discharged, a solenoid unit 22, which includes a casing 20 and is disposed on one end of the valve body 16 through a spacer 18, and a valve mechanism 24 for mutually switching states of communication between the first and second ports 12, 14 under excitation of the solenoid unit 22.

The valve body 16 is formed substantially with a U-shape in cross section that opens on one end side thereof, and first and second ports 12, 14, which open to the exterior, are provided on one side surface of the valve body 16. The first port 12 is connected through a tube or the like to a non-illustrated pressure fluid supply source, and a pressure fluid such as a liquid, for example, is supplied to the first port 12. The second port is connected to another device through a non-illustrated tube or the like.

Further, a communication chamber 30 and an accommodation chamber 32 are formed substantially in the center of the valve body 16. The communication chamber 30 communicates with first and second communication passages 26, 28. The accommodation chamber 32, in which the valve mechanism 24 is accommodated, communicates with the communication chamber 30.

In addition, the first port 12 is connected to a side surface of the communication chamber 30 through the first communication passage 26, which after extending from the side surface perpendicularly to the axis of the valve body 16, is bent at a right angle roughly in a central portion thereof. On the other hand, the second port 14 is connected to a bottom surface of the communication chamber 30 through the second communication passage 28, which extends from the side surface perpendicularly to the axis of the valve body 16.

The accommodation chamber 32 includes a first stepped portion 34, which opens on one end side (in the direction of the arrow A) of the valve body 16 and is expanded in diameter with respect to the communication chamber 30 on a bottom portion thereof on the side of the communication chamber 30, a second stepped portion 36, which is expanded in diameter with respect to the first stepped portion 34, and a third stepped portion 38, which is expanded in diameter with respect to the second stepped portion 36. The first stepped portion 34 is arranged closest to the side of the communication chamber 30 (in the direction of the arrow B), and the second stepped portion 36 and the third stepped portion 38 are distanced successively from the communication chamber 30 (in the direction of the arrow A).

The spacer 18 is installed on one end of the valve body 16 so as to cover the opening thereof, and the solenoid unit (drive unit) 22 is connected to the one end through the spacer 18. The solenoid unit 22 includes a bottomed cylindrical shaped casing 20, a bobbin 42 having a coil 40 wound thereon and disposed in the interior of the casing 20, a fixed iron core 44 fixed to one end of the casing 20, and a movable iron core 46 arranged on an inner side of the bobbin 42 and which is urged in a direction (in the direction of the arrow B) to separate away from the fixed iron core 44.

The bobbin 42 includes a pair of flanges 48a, 48b provided on one end part and another end part of the bobbin 42. The flanges 48a, 48b are expanded in diameter in a radial outward direction. The coil 40 is wound and retained on the bobbin 42 between the flanges 48a, 48b.

The fixed iron core 44 is formed in a substantially columnar shape, for example, from a metal material. The fixed iron core 44 is inserted in the interior of the bobbin 42, and has a protrusion 50 formed on one end thereof, which is fixed in engagement with respect to the casing 20.

The movable iron core 46 is formed in a substantially columnar shape, for example, from a magnetic material, and is disposed coaxially with the fixed iron core 44. On one end thereof on an opposite side from the fixed iron core 44 (in the direction of the arrow B), a pair of engagement grooves 52 is formed on an outer circumferential surface of the movable iron core 46. The engagement grooves 52 are formed to penetrate with the same cross sectional shapes in directions perpendicular to the axial direction of the movable iron core 46. Moreover, the engagement grooves 52 are formed at symmetrical positions about the central axis of the movable iron core 46.

The valve mechanism 24 includes a connecting member 54 connected to an end of the movable iron core 46, a holder 56 disposed in the accommodation chamber 32 of the valve body 16, a valve plug 58 that is retained on an end of the connecting member 54, and a diaphragm 60, which is disposed between the holder 56 and the valve plug 58. The connecting member 54 includes a pair of arms 62. The arms 62 are separated mutually and formed on one end of the connecting member 54. The movable iron core 46 and the connecting member 54 are connected together coaxially by engagement of the arms 62 with the engagement grooves 52 of the movable iron core 46. Further, a fitting hole 64, in which a shaft 74 of the valve plug 58 is fitted, is formed centrally on another end of the connecting member 54.

Further, a spring 66 is interposed between the connecting member 54 and the spacer 18. The connecting member 54 and a valve member 70 are pressed toward the side of the valve body 16 (in the direction of the arrow B) by the elastic force of the spring 66.

The holder 56 is disposed in covering relation to the outer side of the connecting member 54, and is disposed in abutment against the spacer 18 on one end thereof. Further, the connecting member 54 is accommodated displaceably in the interior of the holder 56. Another end portion of the connecting member 54 is engaged with the second and third stepped portions 36, 38 of the valve body 16, and an insertion hole 68, in which the valve plug 58 is inserted, is formed in the center of the other end portion.

As shown in FIGS. 1 through 4, the valve plug 58 includes the cylindrically shaped valve member 70 formed on one end of the valve plug 58, a main body portion 72 that is reduced in diameter with respect to the valve member 70, and the shaft 74, which is formed on the other end of the valve plug 58 and is connected on the main body portion 72. The valve member 70 of the valve plug 58 is accommodated in the communication chamber 30 of the valve body 16, and a poppet 76, which functions as a seat member, is installed in the interior of the valve member 70. The poppet 76 is constituted from an elastic material such as rubber or the like, and is disposed substantially coplanar with, or so as to project slightly from the end surface of the valve member 70.

The main body portion 72 is inserted in the insertion hole 68 of the holder 56, and an annular groove (groove) 78, which is recessed in a radial inward direction, is formed between the main body portion 72 and the valve member 70.

As shown in FIGS. 5A and 5B, the annular groove 78 is formed with a rectangular shape in cross section, and is constituted from an inner circumferential surface 80, which is substantially parallel with the axis of the valve plug 58, and a first wall surface 82 and a second wall surface 84, which extend in radial outward directions from respective ends of the inner circumferential surface 80. Moreover, the first wall surface 82 is formed on the side of the main body portion 72 (in the direction of the arrow A), the second wall surface 84 is formed on the side of the valve member 70 (in the direction of the arrow B), and the first wall surface 82 and the second wall surface 84 are perpendicular, respectively, with respect to the inner circumferential surface 80.

As shown in FIGS. 1 through 4, a portion of the shaft 74 adjacent to the main body portion 72 is reduced in diameter in a radial inward direction, such that when inserted into the fitting hole 64 of the connecting member 54, the shaft 74 is connected by being fitted with respect to the fitting hole 64. Consequently, the movable iron core 46 and the valve plug 58 are connected together integrally through the connecting member 54. Further, opposite ends of the spring 66 are engaged, respectively, with the portion of the shaft 74 that projects from the fitting hole 64, and with respect to a projecting portion of the spacer 18.

The diaphragm 60, for example, is formed in a disk shape from an elastic material such as rubber or the like. The diaphragm 60 is formed with a hole in the center thereof in which the valve plug 58 is inserted, and an inner edge portion 88 that makes up the hole is inserted into the annular groove 78. Moreover, the diaphragm 60 is flexible and is formed with a substantially constant thickness. On the other hand, by installation thereof on the first stepped portion 34 of the valve body 16, an outer edge portion 90 of the diaphragm 60 is sandwiched between the valve body 16 and the holder 56. As a result, the diaphragm 60 blocks communication between the communication chamber 30 and the accommodation chamber 32.

As shown in FIGS. 5A and 5B, on the inner edge portion 88, there are formed a first projection 92, which projects toward a radial inward side with respect to the inner circumferential surface 80, and second and third projections 94, 96, which project from one end surface and another end surface of the inner edge portion 88 perpendicularly with respect to the inner circumferential surface 80. The first through third projections 92, 94, 96 are formed in roughly the same shape with substantially arcuate shapes in cross section, and are formed so as to project at a predetermined height with respect to the inner circumferential surface, the one end surface, and the other end surface.

In addition, apexes of the first through third projections 92, 94, 96 are capable of abutment against the inner circumferential surface 80, the first wall surface 82, and the second wall surface 84 of the annular groove 78. Further, since they are formed in annular shapes, respectively, the first through third projections 92, 94, 96 abut annularly with respect to the annular groove 78.

As shown in FIG. 5A, a thickness dimension T1 from the apex of the second projection 94 to the apex of the third projection 96 is substantially equivalent to, or is less than a height dimension between the first wall surface 82 and the second wall surface 84 in the annular groove 78 (T1≤T2). More specifically, the inner edge portion 88 of the diaphragm 60 is installed such that the inner edge portion 88 is capable of moving a predetermined distance within the annular groove 78 in the thickness direction of the diaphragm 60 (direction A or B), the first projection 92 is always in abutment against the inner circumferential surface 80 of the annular groove 78, and either one of the second projection 94 and the third projection 96 comes into abutment against the first wall surface 82 or the second wall surface 84 of the annular groove 78, with the first projection 92 serving as a fulcrum or support point. As a result, an airtight condition between the communication chamber 30 and the accommodation chamber 32 can be maintained (refer to FIGS. 5A and 5B).

Stated otherwise, the annular groove 78 functions as a retaining means that retains the inner edge portion 88 of the diaphragm 60 so as to be capable of moving over a predetermined distance along the direction of displacement (the directions of arrows A and B) of the valve plug 58.

The solenoid valve 10, which is an example of a valve according to the first embodiment of the present invention, is constructed basically as described above. Next, operations and advantageous effects of the solenoid valve 10 will be described. FIG. 1 illustrates an OFF state, which is a non-excited condition in which current is not applied with respect to the coil 40, and in which the movable iron core 46 is displaced toward the side of the valve body 16 (in the direction of the arrow B) by the elastic force of the spring 66, the poppet 76 closes the opening of the first communication passage 26, and communication between the first port 12 and the second port 14 is blocked.

In this case, as shown in FIG. 5A, at the inner edge portion 88 of the diaphragm 60, the first projection 92 abuts against the inner circumferential surface 80 of the annular groove 78, and the second projection 94 abuts against the first wall surface 82 of the annular groove 78, whereby an airtight condition is maintained between the communication chamber 30 and the accommodation chamber 32 by two points of the first and second projections 92, 94.

In such an OFF state, the coil 40 is excited by activating a non-illustrated power source and energizing the coil 40, and upon an excitation action of the coil 40, the movable iron core 46 is attracted toward the side of the fixed iron core 44 (in the direction of the arrow A), accompanied by the connecting member 54 and the valve plug 58 being displaced integrally in a direction (the direction of the arrow A) away from the valve body 16. Consequently, the poppet 76 of the valve plug 58 separates away from the opening of the first communication passage 26, and by establishing communication between the first communication passage 26 and the communication chamber 30, an ON state is brought about in which the pressure fluid supplied from the first port 12 flows to the second port 14.

At this time, along with displacement of the valve plug 58, the diaphragm 60 undergoes flexure about the outer edge portion 90 owing to the inner edge portion 88 of the diaphragm 60 being displaced toward the side of the solenoid unit 22 (in the direction of the arrow A). Further, by movement of the inner edge portion 88 in the interior of the annular groove 78, a state is brought about (see FIG. 5B) in which the second projection 94 separates away from the first wall surface 82, and the third projection 96 abuts against the second wall surface 84. Moreover, the first projection 92 remains in abutment against the inner circumferential surface 80 of the annular groove 78.

As a result, in the ON state in which the valve plug 58 is separated from the opening of the first communication passage 26, due to the first and third projections 92, 96 being in abutment with respect to the annular groove 78, the pressure fluid, which is supplied to the communication chamber 30, is prevented from leaking out to the side of the accommodation chamber 32 (in the direction of the arrow B). More specifically, at the inner edge portion 88 of the diaphragm 60, an airtight condition is maintained between the communication chamber 30 and the accommodation chamber 32 by two points of the first and third projections 92, 96.

In the foregoing manner, according to the first embodiment, under an excitation action of the solenoid unit 22, the valve plug 58 is displaced in an axial direction, and in the solenoid valve 10, which is capable of switching a flow-through condition of a pressure fluid, the diaphragm 60 is disposed between the valve plug 58 and the valve body 16, and the inner edge portion 88 of the diaphragm 60 is inserted into the annular groove 78 of the valve plug 58. By providing the inner edge portion 88 so as to be capable of moving slightly in the axial direction (the directions of arrows A and B) with respect to the valve plug 58, and by movement of the inner edge portion 88 inside the annular groove 78 upon opening and closing of the valve plug 58, stresses generated by displacement of the valve plug 58 in the vicinity of the inner edge portion 88 can be reduced, compared to a case in which the inner edge portion 88 is fixed entirely with respect to the valve plug 58. As a result, loads imposed on the diaphragm 60 are alleviated, and the durability of the diaphragm 60 can be improved.

Further, since the inner edge portion 88 of the diaphragm 60 is capable of moving slightly with respect to the valve plug 58 upon opening and closing of the valve plug 58, running resistance of the diaphragm 60 at times that the valve plug 58 is operated can be reduced. As a result, since the diaphragm 60 follows movement of the valve plug 58 while being displaced smoothly when the valve plug 58 is operated, driving loads applied to the valve plug 58 can be reduced, and power consumption of the solenoid unit 22 can be suppressed. Stated otherwise, compared to a conventional solenoid valve, the valve plug 58 can be driven with lower consumption of power.

Furthermore, the first through third projections 92, 94, 96 provided on the inner edge portion 88 of the diaphragm 60 are in line contact annularly with respect to the inner circumferential surface 80, the first wall surface 82, and the second wall surface 84 of the annular groove 78. Owing thereto, the first through third projections 92, 94, 96 can come into abutment reliably against the inner circumferential surface 80, the first wall surface 82, and the second wall surface 84 to maintain sealability, sliding resistance when the inner edge portion 88 is displaced in the interior of the annular groove 78 can be suppressed, and smooth displacement in the axial directions can be facilitated. Further, because the first projection 92 is always in contact with respect to the inner circumferential surface 80, whereas either one of the second and third projections 94, 96 come into abutment selectively with respect to the annular groove 78 when the valve plug 58 is opened and closed, sealing can reliably be carried out by abutment at all times of two points from among the first through third projections 92, 94, 96.

Moreover, a case has been described in which the solenoid valve 10 according to the aforementioned embodiment, as shown in FIG. 1, is configured such that the valve body 16 is arranged on the right side and the solenoid unit 22 is arranged horizontally on the left side. However, the invention is not limited to this structure. For example, the solenoid valve 10 may be used with the valve body 16 disposed as a lower portion, and the solenoid unit 22 may be arranged on an upper part of the valve body 16 extending in a vertical direction.

Further, the shapes of the first through third projections 92, 94, 96 provided on the inner edge portion 88 of the diaphragm 60 are not limited to a case of being arcuate in cross section, as described above. For example, as with a diaphragm 100 shown in FIGS. 6A and 6B, the inner edge portion 88 may be formed with a triangular shape in cross section, and first through third projections 102, 104, 106 may be formed respectively on apexes of the inner edge portion 88. Further, straight lines are connected respectively between the first projection 102 and the second projection 104, and between the first projection 102 and the third projection 106. Moreover, the relationship between the thickness dimension from the second projection 104 to the third projection 106, and the height dimension between the first wall surface 82 and the second wall surface 84 in the annular groove 78 is set in the same manner as described above in relation to the diaphragm 60 of the solenoid valve 10 according to the above-described present embodiment.

Figure 6A:
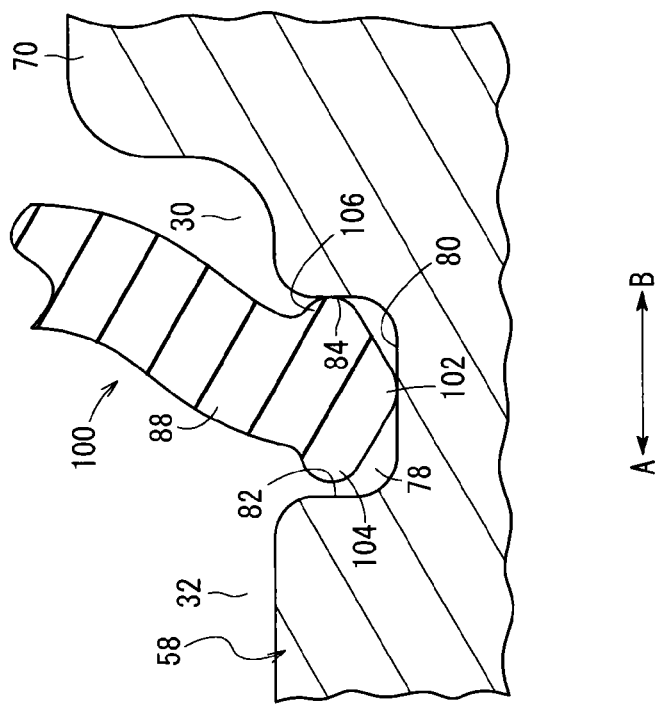
FIGS. 6A and 6B are enlarged cross sectional views, respectively, of a solenoid valve to which a diaphragm according to modified example is applied.
Figure 6B:
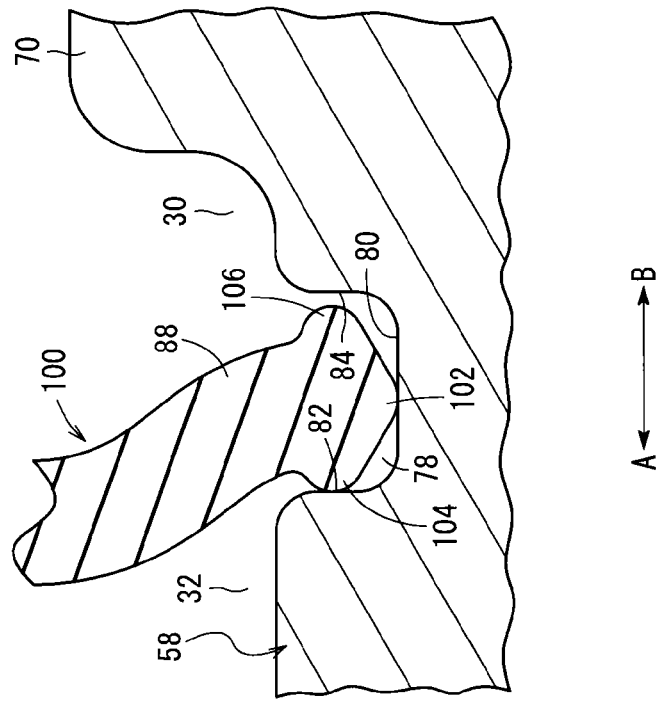

Additionally, accompanying opening and closing of the valve plug 58, the inner edge portion 88 of the diaphragm 100 moves in the interior of the annular groove 78, such that when the valve is opened, a state is brought about in which the second projection 104 is separated from the first wall surface 82 of the annular groove 78, the third projection 106 abuts against the second wall surface 84, and the first projection 102 abuts against the inner circumferential surface 80 of the annular groove 78 (see FIG. 6B). Consequently, an airtight condition between the communication chamber 30 and the accommodation chamber 32 of the valve body 16 is maintained by the first and third projections 102, 106.

On the other hand, when the valve is closed with the valve plug 58 in abutment against the side surface of the communication chamber 30, a state is brought about in which the third projection 106 is separated from the second wall surface 84 of the annular groove 78, the second projection 104 abuts against the first wall surface 82, and the first projection 102 abuts against the inner circumferential surface 80 of the annular groove 78 (see FIG. 6A). Consequently, an airtight condition between the communication chamber 30 and the accommodation chamber 32 of the valve body 16 is maintained by the first and second projections 102, 104.

Figure 7:
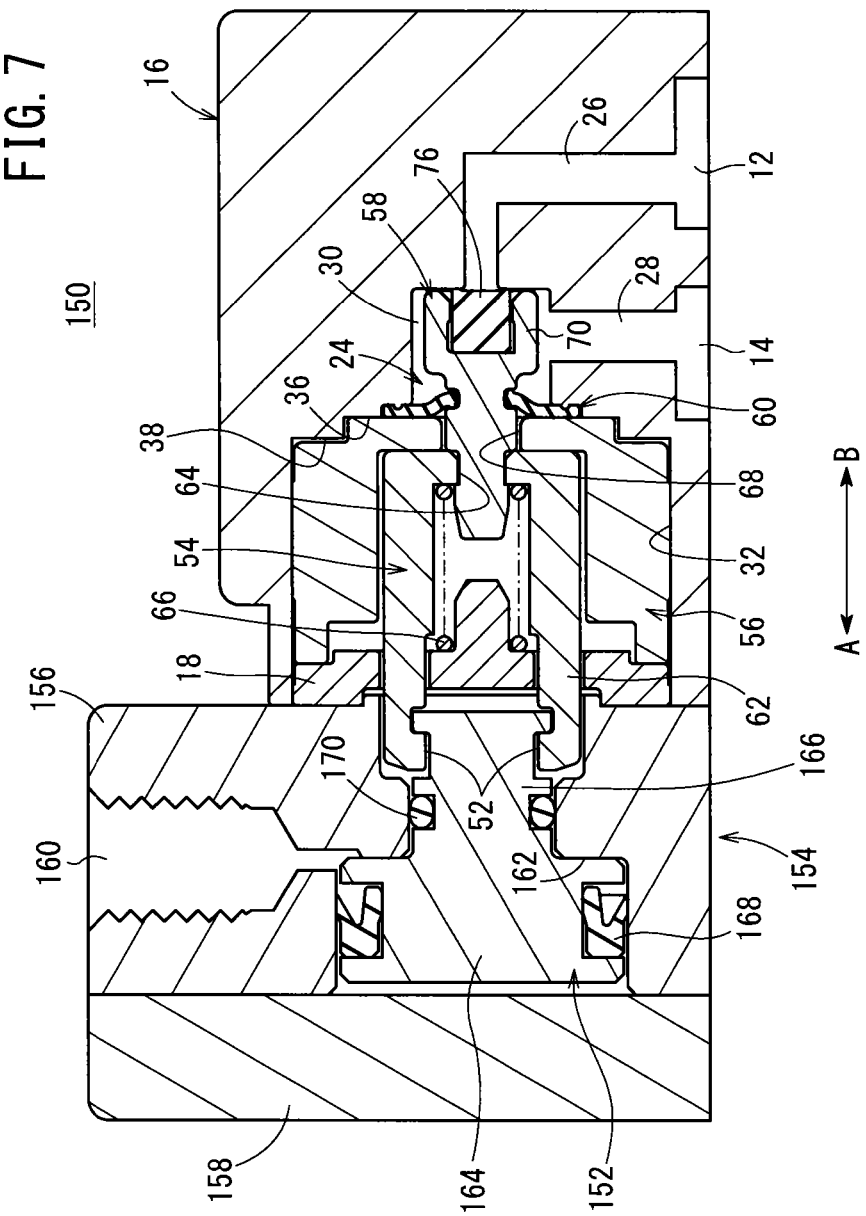
FIG. 7 is an overall vertical cross sectional view of an air-driven valve, as one example of a valve according to a second embodiment of the present invention.

Next, an air-driven valve 150 as an example of a valve according to a second embodiment is shown in FIG. 7. Constituent elements thereof, which are the same as those of the solenoid valve 10 according to the first embodiment, are denoted by the same reference characters, and detailed description of such features is omitted.

The air-driven valve 150 according to the second embodiment differs from the solenoid valve 10 according to the first embodiment, in that, instead of the solenoid unit 22, a cylinder 154 having a piston 152 displaceable under the supply of pilot air (working fluid) is provided as the drive unit.

As shown in FIG. 7, the cylinder 154 that constitutes the air-driven valve 150 includes a cylinder body 156 connected to one end of the valve body 16, the piston 152 disposed displaceably along the interior of the cylinder body 156, and a head cover 158 that closes and seals the end of the cylinder body 156.

In addition, pilot air from a non-illustrated pressure fluid supply source is supplied to a supply port 160, which opens on a side surface of the cylinder body 156, and the pilot air is supplied to a cylinder chamber 162, which is formed in the interior of the cylinder body 156. The piston 152 is pressed and displaced by the pilot air toward the side of the head cover 158, i.e., in a direction away from the valve body 16 (in the direction of the arrow A). The cylinder chamber 162 is closed and sealed by the head cover 158.

The piston 152 is equipped with a head portion 164 disposed in the interior of the cylinder chamber 162, and a rod portion 166 that projects toward the side of the valve body 16 (in the direction of the arrow B) and is connected to the center of the head portion 164. The connecting member 54 is connected to a pair of engagement grooves 52 formed on the end of the rod portion 166, whereby the valve plug 58 and the piston 152 are connected together integrally.

Further, a piston packing 168 is installed through an annular groove on an outer circumferential surface of the head portion 164 on the piston 152, a rod packing 170 is installed through an annular groove on an outer circumferential surface of the rod portion 166, and by sliding contact thereof, respectively, on the inner wall surface of the cylinder chamber 162, pilot air supplied to the cylinder chamber 162 is prevented from leaking out to the exterior.

Next, operations and advantageous effects of the air-driven valve 150 will briefly be described. An OFF state, as shown in FIG. 7, will be described as an initial condition, in which the valve plug 58 and the piston 152 are displaced toward the side of the valve body 16 (in the direction of the arrow B) by the elastic force of the spring 66, the poppet 76 closes the opening of the first communication passage 26, and communication between the first port 12 and the second port 14 is blocked.

In such an OFF state, pilot air is supplied to the supply port 160 from a non-illustrated pressure fluid supply source, and by the pilot air, which is introduced to the cylinder chamber 162, the head portion 164 of the piston 152 is pressed and displaced toward the side of the head cover 158 (in the direction of the arrow A), accompanied by the connecting member 54 and the valve plug 58 being displaced integrally together with the piston 152. Consequently, the poppet 76 of the valve plug 58 separates away from the opening of the first communication passage 26, and by establishing communication between the first communication passage 26 and the communication chamber 30, an ON state is brought about in which the pressure fluid supplied from the first port 12 flows to the second port 14.

At this time, accompanying displacement of the valve plug 58, the diaphragm 60 undergoes flexure about the outer edge portion 90 owing to the inner edge portion 88 of the diaphragm 60 being displaced toward the side of the cylinder 154 (in the direction of the arrow A). Further, by movement of the inner edge portion 88 in the interior of the annular groove 78, a state is brought about in which the second projection 94 separates away from the first wall surface 82, and the third projection 96 abuts against the second wall surface 84. Moreover, the first projection 92 remains in abutment against the inner circumferential surface 80 of the annular groove 78. Consequently, in an ON state in which the valve plug 58 is separated away from the opening of the first communication passage 26, due to the first and third projections 92, 96 being in abutment with respect to the annular groove 78, the pressure fluid, which is supplied to the communication chamber 30, is prevented from leaking out to the side of the accommodation chamber (in the direction of the arrow B).

In the foregoing manner, according to the second embodiment, under a supply of pilot air to the cylinder 154, the valve plug 58 is displaced in an axial direction, and in the air-driven valve 150, which is capable of switching a flow-through condition of a pressure fluid, the diaphragm 60 is disposed between the valve plug 58 and the valve body 16, and the inner edge portion 88 of the diaphragm 60 is inserted into the annular groove 78 of the valve plug 58. By providing the inner edge portion 88 so as to be capable of moving slightly in the axial direction (the directions of arrows A and B) with respect to the valve plug 58, and by movement of the inner edge portion 88 inside the annular groove 78 upon opening and closing of the valve plug 58, stresses generated by displacement of the valve plug 58 in the vicinity of the inner edge portion 88 can be reduced, compared to a case in which the inner edge portion 88 is fixed entirely with respect to the valve plug 58. As a result, loads imposed on the diaphragm 60 are alleviated, and the durability of the diaphragm 60 can be improved.

Further, because the inner edge portion 88 of the diaphragm 60 can be moved slightly with respect to the valve plug 58 at times that the valve plug 58 is opened and closed, during operation of the valve plug 58, running resistance (i.e., resistance to movement) of the diaphragm 60 can be reduced. As a result, since the diaphragm 60 follows movement of the valve plug 58 while undergoing displacement smoothly when the valve plug 58 is operated, the driving load applied to the valve plug 58 can be reduced, and the working pressure of the pilot air supplied to the cylinder 154 can be suppressed. Stated otherwise, compared to a conventional air-driven valve, the valve plug 58 can be driven at a lower working pressure.

The valve according to the present invention is not limited to the above embodiments. Various changes and modifications may be made to the embodiments without departing from the scope of the invention as set forth in the appended claims.

What is claimed is:

1. A valve comprising:
   a valve body having ports to which a pressure fluid is supplied and from which the pressure fluid is discharged;
   a valve plug disposed displaceably in an interior of the valve body for switching a state of communication of the ports;
   a drive unit connected to the valve body and which displaces the valve plug in an axial direction upon supply of a current or a working fluid to the drive unit;
   a flexible diaphragm in form of a sheet, which is disposed between the valve plug and the valve body; and
   a retaining member for retaining the diaphragm,
   wherein the retaining member includes a groove formed on an outer circumferential surface of the valve plug and in which an inner edge portion of the diaphragm is inserted,
   wherein a widthwise dimension of the groove in a direction of displacement of the valve plug, is greater than a thickness dimension of the inner edge portion so that the inner edge portion of the diaphragm is capable of displacement within the groove with respect to the valve plug,
   wherein projections, which project toward inner wall surfaces of the groove, are formed on the inner edge portion of the diaphragm, the diaphragm abutting against the inner wall surfaces via the projections, and
   wherein the projections comprise:
   a first projection that abuts against an inner wall surface of an inner circumferential side in the groove;
   a second projection that abuts against one inner wall surface in the direction of displacement of the valve plug;
   a third projection that abuts against another inner wall surface in the direction of displacement of the valve plug,
   wherein the first projection is always in abutment with respect to the groove, whereas either the second projection or the third projection is brought into abutment with respect to the groove by displacement of the valve plug.

2. The valve according to claim 1, wherein either the second projection or the third projection is displaced about the first projection in accordance with the direction of displacement of the valve plug.

3. The valve according to claim 1, wherein the projections are arcuate in cross section.

4. The valve according to claim 1, wherein the projections are triangular in cross section.

5. The valve according to claim 1, wherein the drive unit comprises a solenoid valve that displaces the valve plug in the axial direction upon being energized.

6. The valve according to claim 1, wherein the drive unit comprises a fluid pressure cylinder that displaces the valve plug in the axial direction upon supply of the working fluid thereto.

\* \* \* \* \*